Patented Aug. 19, 1924.

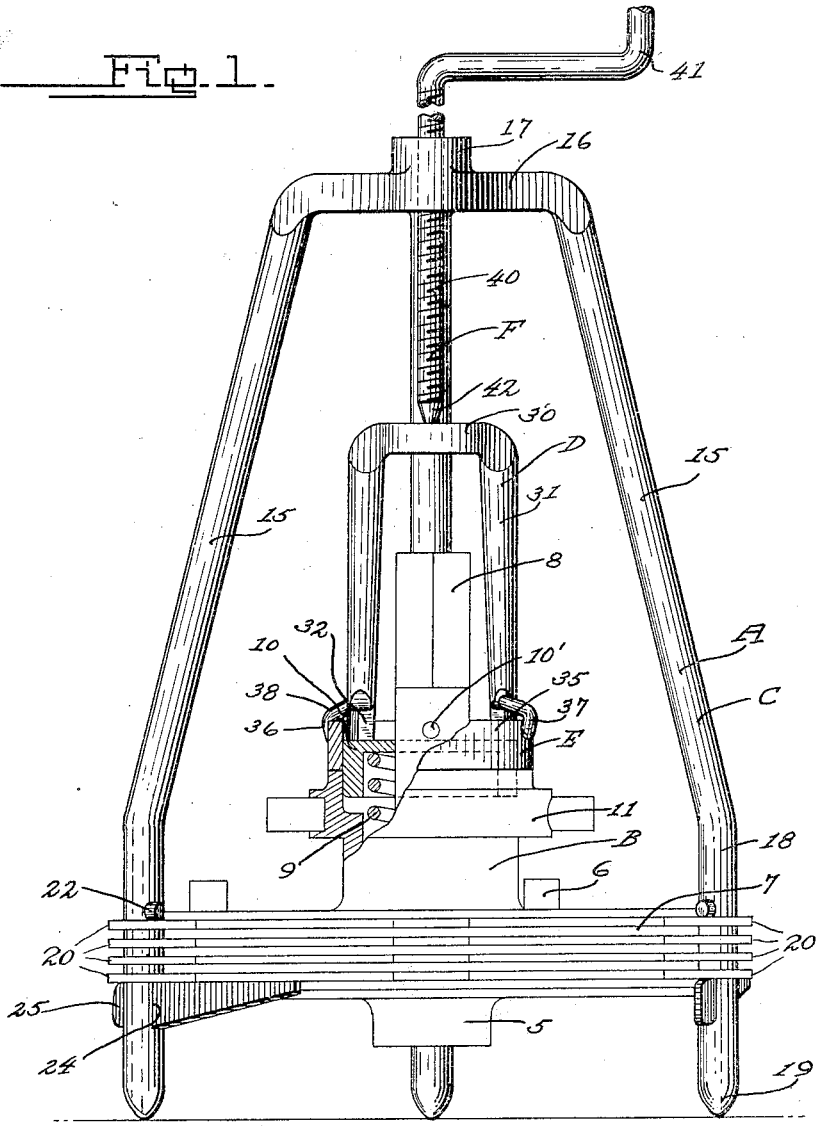

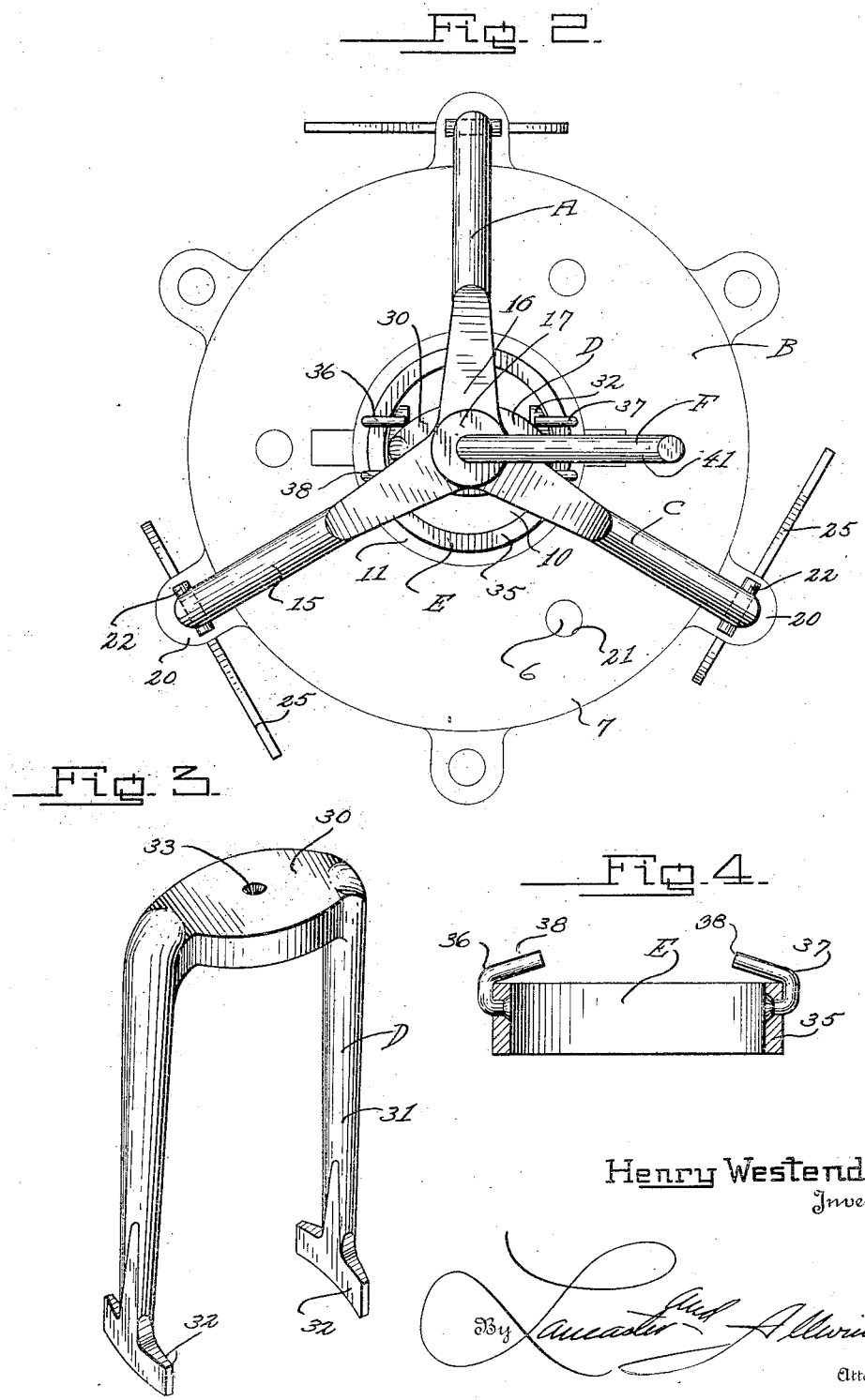

1,505,834

UNITED STATES PATENT OFFICE.

HENRY WESTENDORF, OF HALBUR, IOWA.

CLUTCH DISMEMBERING AND ASSEMBLING TOOL.

Application filed March 13, 1922. Serial No. 543,406.

*To all whom it may concern:*

Be it known that I, HENRY WESTENDORF, a citizen of the United States, residing at Halbur, in the county of Carroll and State of Iowa, have invented certain new and useful Improvements in Clutch Dismembering and Assembling Tools, of which the following is a specification.

This invention relates to tools for automobile repair shops and the primary object of the invention is to provide a single tool for lining up the clutch discs of a clutch and for compressing the clutch spring to facilitate the dismembering and assembling of the clutch.

A further object of the invention is the provision of a dismembering and assembling tool embodying a supporting frame for engaging the clutch and means carried by the frame for compressing the spring to facilitate removal of the spring holding pin, said means allowing the gradual release of the spring so that the same can be readily removed from the clutch shaft.

A further object of the invention is the provision of a novel frame for the clutch dismembering and assembling tool, which not only holds the clutch releasing and compressing member for the spring, but also forms means for aligning the clutch discs, so that the discs will be in correct position when the clutch discs are placed on the clutch spider.

A further object of the invention is the provision of a novel member for engaging the spring collar for permitting the gradual compressing and releasing of the clutch spring, and novel means for preventing the disengagement of the member from out of active position in relation to the clutch spring collar or cap.

A still further object of the invention is the provision of an improved clutch assembling and dismembering tool of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved tool showing the same in engagement with the clutch for facilitating the dismembering thereof, parts of the clutch being shown broken away.

Figure 2 is a top plan view of the improved tool showing the same in operative position in relation to a clutch.

Figure 3 is a detail perspective view of the novel member utilized for engaging the clutch spring collar or cap, and Figure 4 is a diametric section through the guide ring utilized for holding the clutch spring collar engaging member in operative position in relation to the said collar.

Referring to the drawings in detail, wherein similar reference characters designate corresponding parts throughout the several views, the letter A generally indicates the improved clutch dismembering and assembling tool; and B a clutch with which it can be used to advantage.

The clutch B may be of any preferred construction and forms no part of the present invention, but has been merely illustrated to show the use of the improved tool, and as shown in the drawings, the clutch B is of the multiple disc type and includes the spider 5, the drive pins 6 carried by the spider upon which the clutch plates 7 are mounted, the clutch shaft 8, the clutch spring 9, the collar or cap 10 for the spring, and the shifting yoke ring 11.

The improved clutch dismembering and assembling tool A consists essentially of a frame C, the clutch spring collar engaging member D, the guard ring E for the clutch collar engaging member D, and the operating device F for the clutch collar engaging member D.

The frame C forms an important part of the present invention and comprises a plurality of diverging legs 15, which are connected at their upper ends by a spider 16, the axial center of which is provided with a sleeve or head 17. This sleeve or head is provided with internal threads for the reception of the adjusting or operating member F. As shown, the legs 15 are three in number, but it is apparent that there can be as many legs as desired or practical according to the type of clutch being operated upon. The lower terminals of the legs 15 terminate in parallel extending arms 18, which may have extreme lower terminals pointed as at 19 for a purpose which will now be described. The clutch discs 7 are provided with the usual radially extending ears 20 and the parallel arms 18 are adapted to extend through certain of these ears, and it is obvious that when the arms 18 extend through the ears, that the discs 7 will be brought into proper alignment so that the drive pin openings 21 formed in the drive clutch discs 7 will be in proper alignment for receiving the drive pins 6 formed on the clutch spider 5. In order to limit the downward movement of the arms 18 through the ears 20 of the clutch drive discs 7, each of the legs is provided with a diametrically extending limiting pin 22. A pin 22 has been shown merely by way of example and it is to be understood that any suitable enlargement or abutment can be formed on the arms 18 to form a stop for the discs.

In order to firmly hold the clutch in correct position on the frame and against relative movement in relation thereto, each of the arms 18 is provided at a point below the pin 22 with the diametrically extending wedge shaped slot 24, and these wedge shaped slots 24 are adapted to receive wedges 25, which are adapted to be driven in intimate contact with the ears 20 of the lowermost clutch drive disc 7. It can be seen that by arranging the frame in the manner described, the clutch shaft 8 will be at the axial center of the frame and in direct alignment with the threaded bore of the head or sleeve 17 carried by the spider 16.

The clutch spring collar engaging member D comprises a substantially disc shaped head 30 and depending legs 31, which terminate in flat arcuate collar engaging feet 32. These feet 32 are adapted to engage the collar or cap 10 on opposite sides of the clutch shaft 8 as clearly shown in Figure 1 of the drawings, and it is apparent that when the member D is forced downwardly by the operating or adjusting means F, the spring 9 will be compressed. The axial center of the disc shaped head 30 of the member D is provided with an axially disposed recess 33, the purpose of which will be hereinafter more fully described.

In order to hold the member D in correct position on the spring collar 10 and against accidental displacement therefrom, the device E is provided.

The device E consists of a ring 35, which is adapted to engage the upper surface of the yoke or fork ring 11, the outer surface of the clutch spring collar or cap 10 and the lower edge of the arcuate feet 32 of the member D. The ring 35 at diametrically disposed points is provided with pairs of guide members 36 and 37, each of which includes the inwardly extending spaced guide arms 38, which may be secured in any preferred manner, as shown in Figure 4 of the drawings to the ring 35. These inwardly extending guide arms 38 are spaced a sufficient distance apart to receive the depending legs 31 of the member D. It is apparent that when the legs 31 are disposed between the guide arms 38 of the guide members 36 and 37 relative movement of the legs in relation to the ring 35 will be prevented.

The adjusting or operating device F, as shown, includes a threaded stem 40, which is threaded through the internally threaded sleeve or head 17 of the frame C, and the extreme outer end of this stem 40 terminates in a hand crank 41 as clearly shown in Figure 1 of the drawings. The extreme inner end of the threaded stem 40 is provided with a pointed terminal 42 which is adapted to fit in the recess 33 formed in the head 30 of the member C.

It is obvious that by rotating the crank 41 in one direction, the stem 40 will be fed downward, thus forcing the member D downward which will compress the springs. It can be seen that when the crank 41 is rotated in a reverse direction that the stem 40 will be gradually fed upwardly which will permit the gradual lifting of the member D and the consequent gradual releasing of the spring 10 after the spring confining pin 10' has been removed from the clutch shaft 8.

In operation of the improved tool, the frame C is placed over a clutch which is to be dismembered and the arms 18 are placed through the aligned ears 20, after which the wedges 25 are driven in position. The member D is now placed in operative position in relation to the clutch and with the feet 32 resting on the upper surface of the clutch collar 10. The device E is now placed in position and the ring shaped body 35 thereof is slipped over the member D with the guide arms 38 of the guide members 36 and 37 lying on opposite sides of the depending legs 31, and this member is moved downwardly until the same comes into engagement with the yoke or fork ring 11, the collar or cap 10 and the feet 32. The crank 41 is now operated, which will move the member D downwardly, consequently tensioning the spring 9, which will permit the pin 10' to be readily removed. The crank 41 is now rotated in a reverse direction and the gradual releasing of the spring 9 is permitted. After the spring 9 has been expanded to its full extent, the member D is removed, the wedges 25 pulled out from engagement with the walls of the wedge shaped openings 24, and the frame C removed from engagement with the clutch disc plates 27. The clutch can now be readily dismembered.

When it is desired to assemble the clutch again after making the necessary repairs or alterations thereto, the arms 18 are reinserted in the lugs 20, and it is of course, necessary to align the lugs 20 before the arms 18 can be placed in position. Thus, these discs will be held in proper alignment. The wedges 25 are again placed in position as heretofore described, and the members D and E are placed in position as described. The crank 41 is again operated so as to feed the member D downward and when the spring 9 has been depresed a sufficient distance, the pin 10' is placed back in the clutch shaft 8. The clutch is now in its assembled position, and it is merely necessary to remove the tool and place the clutch back in relation to the drive and driven shafts.

From the foregoing description, it can be seen that an improved clutch dismembering and assembling tool has been provided of exceptionally durable and simple character, which will not only facilitate the compressing of the clutch spring to facilitate the dismembering and assembling of the clutch but which will also hold the clutch discs 7 in proper aligned position.

Changes in details may be made without departing from the spirit or scope of this invention; but,

I claim:

1. A clutch dismembering and assembling tool comprising a frame, means formed on the frame for engaging the discs of a clutch, means associated with the frame for engaging the collar of a clutch spring, and means for permitting adjustment of the collar engaging means.

2. In a clutch dismembering and assembling tool a frame for supporting the clutch, a fork for engaging the collar of a clutch spring, and an adjustable member carried by the frame for urging the fork into engagement with the collar for depressing the spring.

3. A clutch dismembering and assembling tool comprising a frame for supporting the clutch, a member for engaging the upper surface of the collar of a clutch spring, and an adjustable rod carried by the frame for forcing the collar engaging member downward to compress said spring.

4. A clutch dismembering and assembling tool for use in connection with a multiple disc clutch including a spider, clutch discs, a clutch shaft, a spring, a collar carried by the upper end of the spring, and a pin for limiting the movement of the spring carried by the shaft; said tool comprising a frame arranged to rigidly hold the discs of the clutch against movement, and means carried by the frame for engaging the collar of the clutch spring to compress the spring and permit removal of the pin limiting upward movement of the collar when in place.

5. A clutch dismembering and assembling tool used in connection with a multiple disc clutch including a spider, clutch discs carried by the spider, and a clutch shaft, a coil spring, a collar for the spring and a pin carried by the shaft for limiting the expanding movement of the spring; said tool comprising a frame, means carried by the frame for holding the clutch against movement thereon, a fork for engaging the collar of the clutch spring, means for preventing movement of the fork in relation to the collar, and adjustable means carried by the frame for adjusting said fork.

6. A clutch dismembering and assembling tool for use in connection with a multiple disc clutch including a spider, a plurality of clutch discs carried by the spider, and a clutch shaft, a spring, a collar for the spring, and a pin carried by the shaft for limiting the upward movement of the collar under the influence of the spring; said tool comprising a member for engaging the collar including a disc shaped head, depending legs, arcuately formed feet on the lower ends of the legs for engaging the upper surface of the collar, an adjustable rod carried by the frame and engaging the disc shaped head, and means for rotating said shaft.

7. A clutch dismembering and assembling tool for use in connection with a multiple disc clutch including a spider, a plurality of clutch discs carried by the spider having ears formed thereon, a clutch shaft, a clutch spring, a collar engaging the spring, a pin extending through the shaft for limiting the upward movement of the collar under the influence of the spring, and a yoke ring mounted upon the clutch; said tool comprising a frame including a plurality of legs, the lower ends of the legs being pointed and disposed in parallel relation for extending through the ears of the clutch discs, whereby the clutch discs will be held in alignment, a head carried by the upper end of the arms, an adjustable rod carried by the head, a member for engaging the collar including a disc shaped head, depending parallel arms and arcuately disposed feet for resting upon the collar, a crank formed on the adjusting rod for permitting the rotation thereof, and a centering ring arranged to engage the collar for preventing relative movement thereof in relation to the arm.

8. In a clutch dismembering, assembling and clutch disc aligning tool, a frame including a plurality of diverging legs, a head carried by the upper ends of the legs, parallel disposed arms formed on the lower ends of the legs for extending through the discs of a clutch, abutments carried by the arms for limiting the movement of the arms in relation to the discs, removable wedge members slidably associated with the arms for engaging the lower surface of the lowermost clutch disc, an adjustable rod carried by the head of the frame, a crank formed on the rod, a fork shaped adjusting member for compressing the spring of the clutch including a head having a bearing formed therein for receiving the lower end of the rod, and a crank formed upon the upper end of the rod for facilitating the rotation thereof.

9. In a clutch dismembering, assembling, and clutch disc aligning tool, a supporting frame for the clutch including a plurality of diverging legs, a head carried by the upper ends of the legs and including an internally threaded sleeve, an adjusting rod threadably mounted in the sleeve, a crank formed on the upper end of the rod, the lower end of the rod being threaded, parallel disposed pointed arms formed on the lower ends of the legs of the frame for engaging the discs of a clutch, means for clamping the discs on the arms, a member for compressing the spring of the clutch including a flat head, depending arms formed on the head, arcuately disposed feet, the flat head having a bearing recess formed in the upper face thereof for receiving the pointed terminal of the adjusting rod, a guide and centering ring arranged to engage the collar carried by the spring of the clutch and pairs of guides carried by the collar for engaging the legs to prevent relative turning movement of the legs in relation to the ring.

HENRY WESTENDORF.